July 1, 1947.  T. F. GIBSON  2,423,095
VARIABLE AREA WING
Filed Jan. 27, 1944
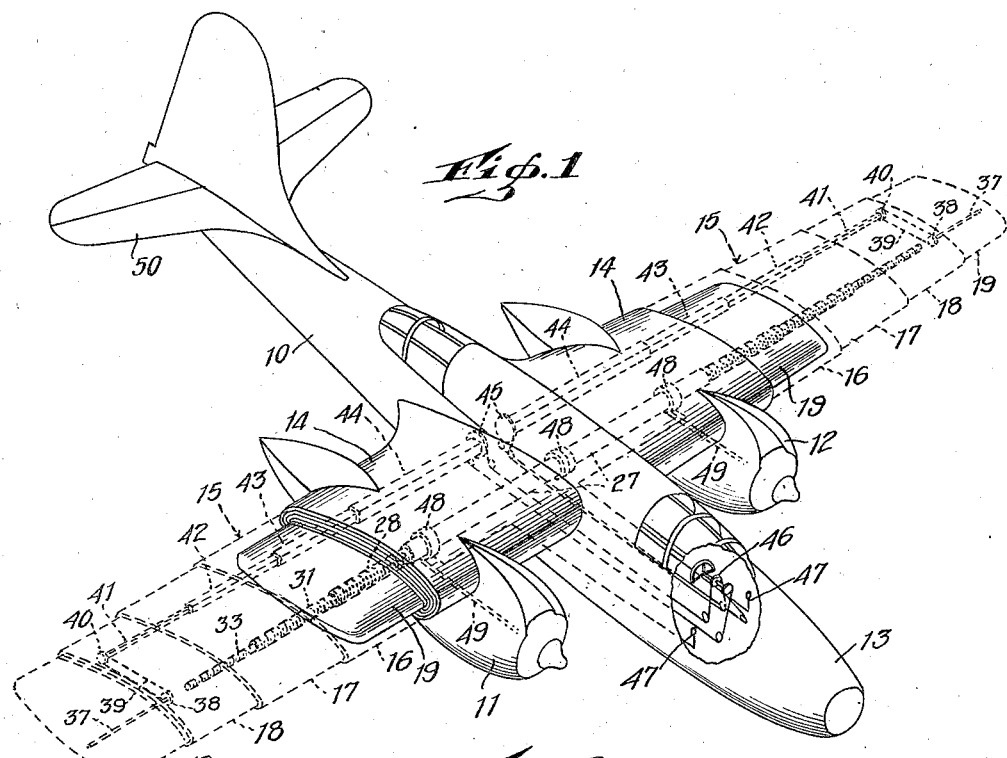
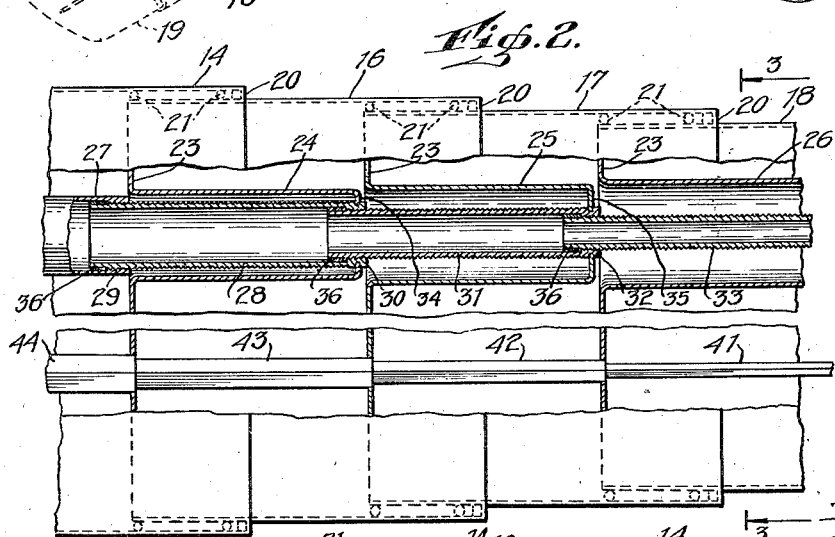
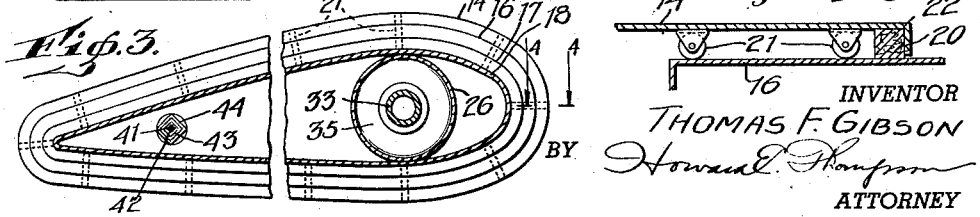
INVENTOR
THOMAS F. GIBSON
BY Howard E. Thompson
ATTORNEY Patented July 1, 1947

2,423,095

UNITED STATES PATENT OFFICE 2,423,095

VARIABLE AREA WING

Thomas F. Gibson, Cleveland Heights, Ohio

Application January 27, 1944, Serial No. 519,963

12 Claims. (Cl. 244—43)

This invention relates to aeroplanes, and particularly to the wing structure thereof. Still more particularly, the invention relates to a wing structure composed of separate telescoping parts or sections adapted to be extended or contracted in varying the wing spread. Particularly in increasing the speed of the aeroplane and reducing the wind resistance. The novel features of the invention will be best understood from the following description when taken together with the accompanying drawing, in which certain embodiments of the invention are disclosed, and in which the separate parts are designated by suitable reference characters in each of the views; and in which:

Fig. 1 is a diagrammatic perspective view generally outlining an aeroplane, showing the wing structure in a collapsed or telescoped position in full lines and in fully extended position in dotted lines.

Fig. 2 is a diagrammatic plan view of a part of the wing structure, showing the sections thereof in an extended position.

Fig. 3 is a section on the line 3—3 of Fig. 2, and omitting part of the construction; and Fig. 4 is a sectional detail on the line 4—4 of Fig. 3.

In the construction of aeroplanes, it has been customary to employ solid wing structures of such size and spread as to maintain the desired lift in raising a maximum load from the ground. After the aeroplane has reached a reasonably high altitude this added wing spread serves no particular purpose, and in fact retards to some degree the progress of the aeroplane. Furthermore, the consumption of fuel constantly reduces the load, and here again, a further reduction in the wing spread would be desirable in order to maintain maximum speed, and greater maneuverability of the aeroplane.

It is the purpose of my invention to provide a wing structure composed of a plurality of sections or parts which are relatively movable to provide, first a full extension of the wing to provide the desired lifting power for the maximum load of the aeroplane, while at the same time, facilitating the gradual reduction in wing spread as the weight of the aeroplane changes by virtue of the fuel consumption. Further, these adjustable wing sections will enable the operator to adjust the wing spread to the degree which provides more efficient operation and maneuverability of the aeroplane.

Furthermore, in certain uses of aeroplanes, particularly where it is intended to operate the same at very high speeds, including what is generally referred to as power diving or jet propulsion, the wing sections may be entirely retracted into the fuselage structure except for the ailerons, which constitute the outer wing sections. With this last mentioned position of the parts, the greatest reduction in wind resistance is made possible, thereby materially increasing the speed, while at the same time, maintaining control of the aeroplane through the ailerons employed.

In order to illustrate one adaptation of my invention, I have diagrammatically shown in Fig. 1 of the drawing at 10, part of the fuselage of an aeroplane of what might be a two or three motor type. If two motors are employed, the motor would be in the auxiliary fuselage portions 11 and 12, and if a third motor is employed, it would be positioned in the front or nose end 13 of the main body or fuselage 10. The fuselage portions 11 and 12 constitute part of short lateral extensions 14 at opposite sides of the fuselage 10, which actually form part of the wings of the aeroplane, but for the sake of this description, I will identify them as wing housings.

As the invention deals solely with the construction of the wing, all details with respect to the general aeroplane structure are omitted in order to simplify the showing. Further, as each wing structure is the same, the brief description of one will apply to both.

The reference character 15 generally identifies the wing structure which may be composed of any desired number of sections telescoping with each other and with the housing 14. In the present illustration three wing sections 16, 17 and 18 are shown. The section 16 fitting snugly in the housing 14, the section 17 in the section 16, and the section 18 in the section 17. Beyond the section 18 is the outer or aileron section 19, which is maintained beyond the housing 14 when all of the sections 16, 17 and 18 are collapsed, as will clearly appear in the full line illustration in Fig. 1 of the drawing.

Each section 16 and 17, as well as the housing 14 has at its outer edge an interned flange 20, which forms a space between the telescoping sections. In this space, and between the normal overlapped portions of the sections and the housing 14, are arranged spaced rollers 21. Also in this space adjacent the flange 20 is arranged a wiping ring 22, the latter serving to remove dust and dirt from the wing sections as they telescope one within the other. The flange 20 serves to remove any such thing as ice or similar deposits which may collect on the wing sections, acting in this sense as a scraper. The rollers 21 will be arranged at different positions around the sections, as is diagrammatically indicated in dotted lines in Fig. 3 of the drawing.

At this time, it is also well to bear in mind that the illustrations in all of the figures are more or less diagrammatic, and from this standpoint, it will be apparent that the structures of the various parts will be made to suit the designs of aeroplanes as commonly constructed, aside from the modifications which are specifically mentioned.

Each section 16, 17 and 18 has an inner end wall 23. The sections 16, 17 and 18 have tubular portions 24, 25 and 26 respectively, which extend outwardly. The tubular portion 24 being the smallest in diameter, whereas the portion 26 is the largest, and these portions are adapted to telescope one within the other when the sections 16, 17 and 18 are moved within and housed within the housing 14. The tubes 24—26 are adapted to fit freely and yet snugly within each other to further support and reinforce the wing, particularly when the sections are drawn inwardly.

While the parts 24, 25 and 26 are defined as tubes, when it is desired to minimize the thickness of a wing, these parts may simply comprise segments arranged at the front and rear sides only of screw shafts, later described, and not on upper and lower surfaces of these shafts. Arranged in the housing 14 is a tubular drive shaft 27, which is in threaded engagement with a tubular feed or screw shaft 28, as seen at 29.

The outer end of the shaft 28 has an internally threaded collar portion 30 in threaded engagement with another tubular screw shaft 31. The shaft 31 has at its outer end an internally threaded collar 32 in threaded engagement with another tubular screw shaft 33. This structural arrangement will continue throughout as many sections as may be employed in the wing structure. The collars as at 30 and 32, and a corresponding collar at the end of the shaft 33 will have annular grooves to receive end wall portions on the tubes 24, 25 and 26, the end wall and the tube 24 being shown at 34 and on the tube 25 at 35. Thus the collars 30, 32 are free to rotate in said end walls 34, 35 as will be apparent. On the inner ends of all of the shafts 28, 31 and 33 are stop sleeves 36 to check outward or opening movement of the various wing sections.

In one directional rotation of the shafts 27, 28, 31 and 33, the sections will be moved inwardly, and in the other directional rotation thereof, these sections will be moved outwardly. The latter movement is checked by the stops 36, whereas inward movement is checked by the walls 34, 35 and so forth, as will clearly appear from a consideration of Fig. 2 of the drawing. For example, the wall 35 will abut the sleeve 36, whereas the wall 34 will engage the internally threaded end 29 of the shaft 27.

The aileron 19 is supported on a shaft 37, which is suitably supported in connection with the tube 26 of the outer section 18. On this shaft within the section 18 is a sprocket or similar wheel 38 over which passes a chain 39, which in turn passes around a sprocket 40 of the shaft 41, the illustration in the accompanying drawing being diagrammatic. The shaft 41 is one of a plurality of telescoping shafts of square or other angular cross sectional form, or otherwise keyed together. The shaft 41 is arranged in the section 18 and telescopes within a shaft 42 in the section 17, the latter telescoping with a shaft 43 of the section 16 and finally with a shaft 44 in the housing 14. The shaft 44 of one wing structure will be independent of the other, so as to provide independent control of the ailerons of each wing. Suitable controlling means is provided on inner ends of the shafts 44, as indicated at 45, which are coupled with the controls 46 in the pilot compartment of the aeroplane, as with the control of the ailerons of aeroplanes of general construction.

The diagrammatic illustration in Fig. 1 is simply to show the general relationship and method of operation. The particular mechanism employed forms no part of the present conception. The only thought which is expressed, is that the operating shafts 41—44 are keyed to each other and telescoped so as to maintain operation of the ailerons at all times and in the different positions of the wing sections.

Suitable controls 47 will be arranged in the control room for actuating forward and reverse drive clutch mechanisms 48 on the shafts 27 for rotating the various screw shafts in fully extending and in contracting the various wing sections.

It will be understood that the screw shafts will be operated from the motor shafts 49 through the clutches 48, particularly in the larger type of aeroplane constructions. However, in smaller planes, the wing sections may be manually controlled and operated through suitable hand operated cranks and gearing employed.

Furthermore, in exceptionally large planes, separate drives may be provided for the operation of the wing sections, and in such instances, speed of operation may be controlled to quickly provide increased or decreased wing spread to suit emergencies in maneuvering an aeroplane. This would be particularly desirable in combat planes as used by the armed forces. It is also conceivable that in some instances, a degree of expansion or contraction of one wing may be varied, as compared with that of its companion wing. For this reason, independent controls are diagrammatically illustrated at 47 in Fig. 1 of the drawing.

It will also be apparent that the invention deals primarily with the collapsibility of an aeroplane structure by employing collapsible or telescoping sections, and it is immaterial how many collapsible wing structures are employed on the particular aeroplane or aeronautical apparatus.

In addition to the advantages of collapsibility in maneuvering or operating an aeroplane, this collapsibility also lends itself to the storage of aeroplanes in a minimum amount of space. This is not only desirable in storage in hangers, but also on board aeroplane carriers. The collapsing principles or characteristics also adapts the aeroplane to conversion to a land vehicle or boat, depending upon the running or landing gear mechanism employed.

It should also be kept in mind that where single motored planes are employed, or planes wherein the power or driving mechanism is included in the fuselage, the housings 14 are not required, as the wing sections may be telescoped directly into the fuselage, and relatively short housing portions could be employed if necessary. Where the fuselage is sufficiently wide to take all of the collapsed or telescoped sections, then the same can be collapsed within the fuselage. It will be apparent that the degree of collapsibility may be varied in different adaptations and uses of the invention, to the end of reducing the apparatus to substantially a fuselage body for any of the purposes or uses heretofore set forth.

Having fully described my invention, what I claim as new and desire to secure by Letters Patent is:

1. In an aeroplane, the combination with the fuselage having a fixed wing portion at each side thereof, of telescoping wings arranged at opposite sides of the fuselage and movable into and out of said fixed wing portions, each telescoping wing being composed of movable sections adapted to be telescoped one within the other at adjacent sides of the fuselage, an aileron movably supported in connection with the outermost section of each wing and maintained in extended position beyond the telescoping wing sections and said fixed wing portions in all positions thereof, and means compensating for different positions of the telescoped sections of the wings for actuating the ailerons in all positions of said sections.

2. In an aeroplane, the combination with the fuselage having a fixed wing portion at each side thereof, of telescoping wings arranged at opposite sides of the fuselage and movable into and out of said fixed wing portions, each telescoping wing being composed of movable sections adapted to be telescoped one within the other at adjacent sides of the fuselage, an aileron movably supported in connection with the outermost section of each wing and maintained in extended position beyond the telescoping wing sections and said fixed wing portions in all positions thereof, means compensating for different positions of the telescoped sections of the wings for actuating the ailerons in all positions of said sections, and independent controls for operating the telescoping sections of each wing.

3. The combination with the fuselage of an aeroplane, of wing housings at opposed sides of the fuselage, a plurality of wing sections telescoping with each other and with each of said housings, ailerons movably supported in connection with the outermost telescoping wing sections and maintained beyond the limits of said housings in the fully telescoped positions of said wing sections, means compensating for the telescoped positions of said sections for actuating the ailerons in all positions of said wing sections, and means for operating said sections.

4. The combination with the fuselage of an aeroplane, of wing housings at opposed sides of the fuselage, a plurality of wing sections telescoping with each other and with each of said housings, ailerons movably supported in connection with the outermost telescoping wing sections and maintained beyond the limits of said housings in the fully telescoped positions of said wing sections, means compensating for the telescoped positions of said sections for actuating the ailerons in all positions of said wing sections, means for operating said sections, and means comprising anti-frictional devices for supporting and guiding the wing sections in the telescoping movement thereof one within the other.

5. The combination with the fuselage of an aeroplane, of wing housings at opposed sides of the fuselage, a plurality of wing sections telescoping with each other and with each of said housings, ailerons movably supported in connection with the outermost telescoping wing sections and maintained beyond the limits of said housings in the fully telescoped positions of said wing sections, means compensating for the telescoped positions of said sections for actuating the ailerons in all positions of said wing sections, means for operating said wing sections, and means at the outer end of each wing section engaging the companion inner section for wiping outer surfaces of the inner section in telescoping said inner section within the first mentioned section.

6. The combination with the fuselage of an aeroplane, of wing housings at opposed sides of the fuselage, a plurality of wing sections telescoping with each other and with each of said housings, ailerons movably supported in connection with the outermost telescoping wing sections and maintained beyond the limits of said housings in the fully telescoped positions of said wing sections, means compensating for the telescoped positions of said sections for actuating the ailerons in all positions of said wing sections, means for operating said sections, said telescoping sections having wide overlapped portions in the fully extended position of said sections, and means between overlapped portions of the sections for supporting and guiding the sections in their movement one with respect to the other.

7. The combination with the fuselage of an aeroplane, of wing housings at opposed sides of the fuselage, a plurality of wing sections telescoping with each other and with each of said housings, ailerons movably supported in connection with the outermost telescoping wing sections and maintained beyond the limits of said housings in the fully telescoped positions of said wing sections, means compensating for the telescoped positions of said sections for actuating the ailerons in all positions of said wing sections, means for operating said sections, said telescoping sections having wide overlapped portions in the fully extended position of said sections, means between overlapped portions of the sections for supporting and guiding the sections in their movement one with respect to the other, and the means for operating said sections comprising telescoping screw shafts.

8. An aeroplane comprising a fuselage, fixed short wing portions at opposite sides of the fuselage, ailerons at opposite sides of the fuselage, means comprising wing sections telescoping with each other and with each of said wing portions for movably supporting the ailerons at side portions of the fuselage, means for operating said wing sections to vary the wing spread of an aeroplane, said telescoping wing sections maintaining the ailerons operable beyond the short wing portions, and means for operating the ailerons in the different positions of said wing sections.

9. An aeroplane comprising a fuselage, fixed short wing portions at opposite sides of the fuselage, ailerons at opposite sides of the fuselage, means comprising wing sections telescoping with each other and with each of said wing portions for movably supporting the ailerons at side portions of the fuselage, means for operating said wing sections to vary the wing spread of an aeroplane, means for operating the ailerons in the different positions to said wing sections, and all of said wing sections being adapted to be collapsed in said short wing sections, leaving the ailerons disposed at the ends of said wing portions in flight operation of the aeroplane.

10. An aeroplane comprising a fuselage, wings extending from opposite sides of the fuselage, each of said wings being composed of a fixed section, a plurality of telescoping sections and end sections, means for moving the telescoping sections into extended and contracted positions, said end sections maintaining extended operable positions beyond the outermost telescoping wing sections in contracted and fully extended positions of said wing sections, means movably supporting said end sections, and means for operating said end sections in all positions of the telescoping wing sections in controlling the operation of the aeroplane.

11. An aeroplane comprising a fuselage, wings extending from opposite sides of the fuselage, each of said wings being composed of a fixed section, a plurality of telescoping sections and end sections, means for moving the telescoping sections into extended and contracted positions, said end sections maintaining extended operable positions beyond the outermost telescoping wing sections in contracted and fully extended positions of said wing sections, means movably supporting said end sections, means for operating said end sections in all positions of the telescoping wing sections in controlling the operation of the aeroplane, and said last named means comprising telescoping and keyed shafts.

12. An aeroplane comprising a fuselage, wings extending from opposite sides of the fuselage, each of said wings being composed of a fixed section, a plurality of telescoping sections and end sections, means for moving the telescoping sections into extended and contracted positions, said end sections maintaining extended operable positions beyond the outermost telescoping wing sections in contracted and fully extended positions of said wing sections, means movably supporting said end sections, means for operating said end sections in all positions of the telescoping wing sections in controlling the operation of the aeroplane, said last named means comprising telescoping and keyed shafts, and means controlling operation of said shafts.

THOMAS F. GIBSON.

REFERENCES CITED

The following references are of record in the file of this patent:

UNITED STATES PATENTS

| Number | Name | Date |
| --- | --- | --- |
| 1,274,986 | Carolin | Aug. 6, 1918 |
| 1,904,281 | Ellingston | Apr. 18, 1933 |
| 2,056,188 | Hayden | Oct. 6, 1936 |
| 2,081,436 | Martin | May 25, 1937 |
| 2,231,524 | Martin | Feb. 11, 1941 |
| 2,222,997 | Bellanca et al. | Nov. 26, 1940 |

FOREIGN PATENTS

| Number | Country | Date |
| --- | --- | --- |
| 764,709 | France | Mar. 12, 1934 |
| 528,808 | Great Britain | Nov. 7, 1940 |